S. W. SCOTT.
PNEUMATIC WHEEL.
APPLICATION FILED OCT. 3, 1913.

1,173,986.

Patented Feb. 29, 1916.

Witnesses
Hugh H. Ott
P. M. Smith

Inventor
S. Walter Scott
By Victor J. Evans
Attorney

UNITED STATES PATENT OFFICE.

S. WALTER SCOTT, OF TROY, NEW YORK.

PNEUMATIC WHEEL.

1,173,986.  Specification of Letters Patent.  Patented Feb. 29, 1916.

Application filed October 3, 1913. Serial No. 793,217.

*To all whom it may concern:*

Be it known that I, S. WALTER SCOTT, citizen of the United States, residing at Troy, in the county of Rensselaer and State of New York, have invented new and useful Improvements in Pneumatic Wheels, of which the following is a specification.

This invention relates to pneumatic wheels, the broad object of the invention being to provide a vehicle wheel tire in which the body of the tire is supported resiliently upon and by an inflated pneumatic tube, the latter being thoroughly inclosed and protected so that it is practically impossible to puncture the same.

A further object of the invention is to provide a special form of rim particularly adapted for use in connection with the tire of this invention, whereby the tire may be removed and replaced in an easy and expeditious manner.

With the above and other objects in view, the invention consists in the construction, combination and arrangement of parts, as will hereinafter be more fully described, illustrated and claimed.

Figure 1:
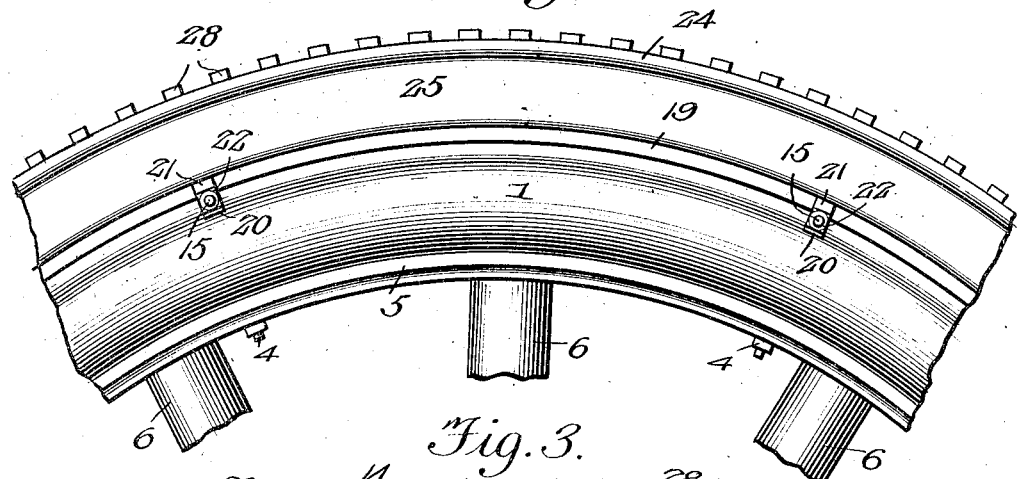
Figure 3:
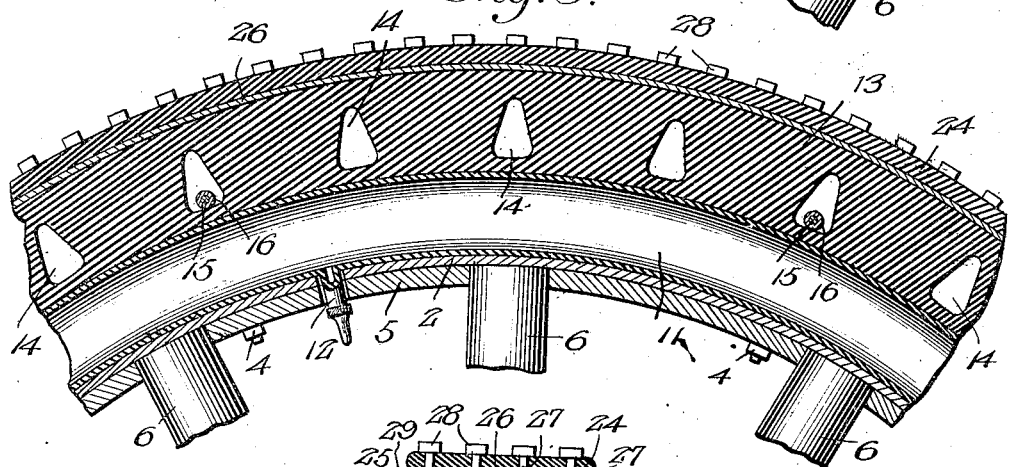
Figure 4:
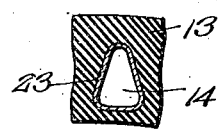
Figure 2:
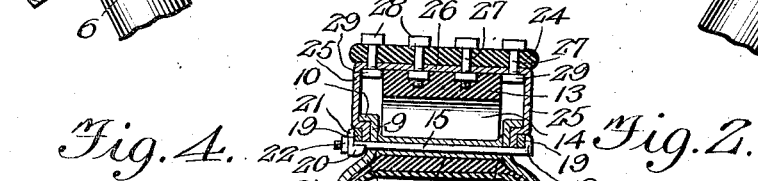

In the accompanying drawings:—Figure 1 is a side elevation of a section of a tire and rim embodying the present invention. Fig. 2 is a vertical cross section through the same. Fig. 3 is a vertical longitudinal section thereof. Fig. 4 is a detail vertical longitudinal section through the tire body showing one of the sheet metal liners.

Referring to the drawings, A designates generally a rim formed of sheet metal and rolled into the shape illustrated in Fig. 2, the said rim being preferably formed in two sections 1 and 2 which meet at a central point on the line 3, the two sections of the rim being fastened by bolts 4 or the equivalent thereof to an annular series of spoke sockets 5 in which the outer ends of the spokes 6 are inserted and held.

The sections 1 and 2 of the rim are bulged outwardly in opposite directions as shown at 7, the said bulged portions of the rim extending laterally beyond the tire proper hereinafter described so as to prevent injury to the tire by reason of the latter coming in contact with obstructions and particularly curbs, the rim section is then offset inwardly as indicated at 8 and then extended outwardly as shown at 9 in parallel relation to the opposite rim section, the extreme outer edges or margins of the rim sections being bent outwardly to form annular lips 10 for properly positioning and holding the skirt clamping rings hereinafter described.

Contained within the rim hereinabove described is what is known as an inner or pneumatic tube 11 adapted to be inflated by means of a valve indicated at 12, the valve tube extending inwardly from the inside of the rim as illustrated in Fig. 3.

Supported by the pneumatic tube 11 is the main tire body 13 which is preferably formed of rubber having the proper resiliency, said tire body extending entirely around and being supported at all points by the inflated tire 11. At suitable intervals the tire body 13 is provided with radially extending slots 14 and through said slots bolts 15 are inserted, said bolts also passing through holes in the parallel portions 9 of the rim sections. The portions 9 of the rim are held at a predetermined distance apart by means of spacing sleeves or tubular washers 16 the opposite extremities of which are expanded as shown at 17 and bearing against the inner faces of the portions 9 of the rim. Each of the bolts is provided at one end with a head 18 in the form of a right angular hook which bears against the outer face of one of a pair of skirt and rim clamping rings 19 arranged on the outer sides of the rim sections as shown and within the outwardly projecting annular lips 10. Each bolt 15 passes through one of the spacing sleeves 16 and is provided on its opposite end with a clip 20 having a right angular hook 21 adapted to engage the outer face of the oppositely located ring 19, the clip 20 being held in place by means of a nut 22 threaded on the bolt 15. By means of the construction just described it will be seen that the portions 9 of the rim are held in rigid relation to each other and at a certain distance apart to admit of the radial movement of the tire body 13 which as previously indicated is yieldingly supported by the inner tube 11. If desired each of the slots 14 in the tire body 13 may be lined with sheet metal as indicated at 23 to avoid undue wear on the tire body.

Secured to and extending entirely around the tire body 13 is an annular tread 24 of rubber or some composition of rubber and fabric, the said tread having secured thereto a double skirt, the side portions of which are indicated at 25 and the central or connecting portion of which is indicated at 26, the last named portion of the skirt being secured to the tread 24 by means of non-skid bolts 27 the heads 28 of which project beyond the periphery of the tread 24 and the inner ends of which and also the nuts 29 thereon are embedded in the outer face of the tire body 13. The nuts 29 on the outermost rows of bolts 28 are adapted to come in contact with the outer faces of the annular lips 10 of the rim so as to limit the inward movement of the tire body 13 and the tread 24. The inner edges of the skirts 24 are fastened against the portions 9 of the rim and within the annular lips 10 by means of the clamping rings 19 which are in turn held firmly in place by the tie bolts 15 and clips 20.

The tire body 13 is provided at opposite sides and along the inner corners thereof with flexible annular shoulders 30 which by coming in contact with the inwardly offset portions of the rim sections serve to limit the outward movement of the tire body. These shoulders are extended to form relatively thin flaps 31 which lie between the inner tube 11 and the rim and thereby serve to protect the inner tube. Additional slots 14 may be provided in addition to those through which the tie bolts 15 pass to give increased resiliency to the tire and also to lighten and cheapen the construction thereof in accordance with the load to be imposed thereon, the tire hereinabove described being adapted either for light duty such as is required by automobiles or for heavy duty such as is required by motor trucks and the like.

The tire may be removed by disconnecting one of the rim sections from the spoke sockets 5 and the remainder of the wheel as will be readily understood upon reference to Fig. 2. The bulging and inward offsetting of the rim sections and the formation of the annular lips 10 serves to materially strengthen and stiffen the rim sections enabling them to be made of metal of comparatively light gage. The clamping rings 19 also assist in stiffening the rim, when taken in connection with the spacing sleeves 16 and the tie bolts 15. One side of the rim cannot be bent or twisted without carrying the other side of the rim with it so that in this way both sides or flanges of the rim mutually support and brace each other.

The skirts which are flexible and which may be composed of any suitable flexible material or fabric, keep all water, dirt and foreign matter out of the rim and away from the inner tube and tire body. Furthermore, the skirts and their fastening means serve to prevent the tire from rolling or shifting laterally and also serve to limit the outward movement of the tire body and tread.

It will of course be understood that the size and proportion of the parts of the rim and tire may be varied in accordance with the desire of the manufacturer and the particular service to which the tire is to be put. By having a resilient or air cushion backing for the tire body, the tire as a whole will last much longer than the ordinary cushion or solid tires which are supported directly by the rim and without the interposition of a pneumatic tube. In the preferred embodiment of the invention the number of slots 14 in the tire body will be the same as the number of tie bolts 15 employed or a multiple of the number of bolts so that the slots 14 will come at proper intervals to receive said tie bolts. Should the tube become deflated for any reason, the tread or body portion of the tire will be supported by the outer edge of the rim and also by the bolts which pass through the body portion of the tire.

What I claim is:—

In combination, a wheel, a tire receiving metallic rim carried by said wheel, integral parallel offsets formed upon said rim, a plurality of spacing sleeves extending between and engaging the inner surfaces of said offsets, an inflatable tire mounted in said rim, a solid tire seated upon said inflatable tire, said solid tire being formed with a circumferentially spaced apart series of openings in which said sleeves are disposed, an annular tread disposed around said solid tire, rightangular portions formed upon the rim offset and extending short of the opposite edges of said tread, a flexible shield bearing upon said solid tire and secured to said tread substantially throughout its width, said shield extending at right angles to the plane of said tread and seating under the right angular portions of and against said rim offset, a plurality of tie bolts passing through said sleeve and rim offsets, a pair of clamping rings supported upon said bolts and engaging said shield to clamp them against said rim offsets, a shoulder clip carried by said bolts engaging one of said rings, a hook offset upon each of said bolts engaging the opposite ring, said clip being looped upon each of said bolts, and a clamping nut upon each of said bolts for jamming said clip against said rings.

In testimony whereof I affix my signature in presence of two witnesses.

S. WALTER SCOTT.

Witnesses:
 JOSEPH E. HOVER,
 RALPH T. SIMMONS.

Copies of this patent may be obtained for five cents each, by addressing the "Commissioner of Patents, Washington, D. C."